UNITED STATES PATENT OFFICE.

BENNO HOMOLKA, OF FRANKFORT-ON-THE-MAIN, AND RICHARD WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

SULFUROUS LEUCO BODY AND PROCESS OF MAKING SAME.

No. 894,006.       Specification of Letters Patent.       Patented July 21, 1908.

Application filed February 5, 1907. Serial No. 355,875.

*To all whom it may concern:*

Be it known that we, BENNO HOMOLKA, Ph. D., and RICHARD WELDE, Ph. D., chemists, citizens of the Empire of Germany, and residing at Frankfort-on-the-Main and Höchst-on-the-Main, Germany, respectively, have invented certain new and useful Improvements in Making Sulfurous Leuco Bodies, of which the following is a specification.

We have found that alpha-oxythionaphthenes having the general formula:

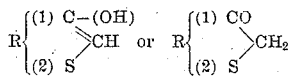

or their carboxylic acids

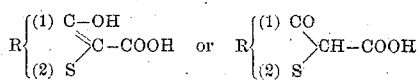

when heated with thiosulfates soluble in water in presence of glycerin to temperatures above 100° C. yield sulfurous dyestuffs which oxidized by themselves or on the fiber may be transformed into valuable blue, violet to red dyestuffs.

In the above general formulas "R" means an aromatic residue, of which the hydrogen atoms may be partly or wholly substituted by other elements or groups.

Example: 10 parts by weight of alpha-oxythionaphthene or the equivalent quantity of alpha-oxythionaphthene carboxylic acid are heated with about 100 parts by weight of sodium thiosulfate ($Na_2S_2O_5+5H_2O$) or the corresponding quantity of another alkaline or alkaline earths thiosulfate, and 100–150 parts by weight of industrial glycerin to about 130° C. without access of air, till no further thioindoxyl can be traced. The mass is allowed to cool and is diluted with water, the leuco-body formed is filtered, washed with water and made into a paste or dried in a vacuum. For the afore said alpha-oxythionaphthene or alpha-oxythionaphthene carboxylic acid any other homologous or substituted alpha-oxythionaphthene or alpha-oxythionaphthene carboxylic acids may be treated in like manner and yield thus the homologous and substituted leuco bodies.

The sulfurous leuco bodies thus obtained are colorless, not fusible without decomposing and little soluble in water. They are readily soluble in alcohol, wood spirit, acetone and in dilute caustic alkalies. The alkaline solution, when exposed to the air, rapidly separates the sulfurous dyestuff.

Having now described our invention what we claim is:

1. The herein described process of making sulfurous leuco bodies, which consists in heating alpha-oxythionaphthenes with glycerin and thiosulfates soluble in water to temperatures above 100° C.

2. The herein described process of making sulfurous leuco bodies, which consists in heating alpha-oxythionaphthene carboxylic acids with glycerin and thiosulfates soluble in water to temperatures above 100° C.

3. As new product, a sulfurous leuco-body being colorless, little soluble in water, readily soluble in alcohol, wood spirit, acetone and dilute caustic alkalies, not fusible without decomposing; the alkaline solution, when exposed to the air, separates the red to red-brown dyestuff.

In testimony, that we claim the foregoing as our invention, we have signed our names in presence of two subscribing witnesses.

BENNO HOMOLKA.
      RICHARD WELDE.

Witnesses:
    JEAN GRUND,
    CARL GRUND.